(12) United States Patent
Wang

(10) Patent No.: US 6,688,703 B1
(45) Date of Patent: Feb. 10, 2004

(54) WHEEL RIM COVER

(76) Inventor: Chu-Li Wang, No. 295, Lane 168, Sec. 1, Chang Hsi Road, Tainan (TW), 709

( * ) Notice: Subject to any disclaimer, the term of this patent is extended or adjusted under 35 U.S.C. 154(b) by 0 days.

(21) Appl. No.: 10/404,131

(22) Filed: Apr. 2, 2003

(51) Int. Cl.[7] .................................................. B60B 7/06
(52) U.S. Cl. ............................... 301/37.23; 301/37.32; 301/37.106
(58) Field of Search ...................... 301/37.101, 37.102, 301/37.22, 37.23, 37.31, 37.32, 37.34, 37.106, 37.107

(56) References Cited

U.S. PATENT DOCUMENTS

| | | | | |
|---|---|---|---|---|
| 2,963,324 A | * | 12/1960 | Wood | 301/37.23 |
| 3,044,834 A | * | 7/1962 | Shoemaker | 301/37.23 |
| 4,235,271 A | * | 11/1980 | Olsen et al. | 152/186 |
| 4,268,090 A | * | 5/1981 | Rush | 301/5.22 |
| 6,059,375 A | * | 5/2000 | Shryock | 301/37.34 |
| 6,059,376 A | * | 5/2000 | Shryock | 301/37.109 |
| 6,575,537 B1 | * | 6/2003 | Wang | 301/37.23 |

* cited by examiner

*Primary Examiner*—Russell D. Stormer
(74) *Attorney, Agent, or Firm*—Bacon & Thomas, PLLC

(57) ABSTRACT

A wheel rim cover includes a cover body and a decorative cover combined at an outer side of the cover body. The cover body has a plurality of fixing members protruding sidewise on an inner surface spaced apart equidistantly in a circle and fixed with a circular ring. The cover body has a plurality of hollow tubes, and a coil spring fitting around each hollow tube. The decorative cover has a diameter larger than that of the cover body, and a plurality of threaded rods standing sidewise on an inner surface with a washer and a nut. The threaded rods directly extend through the hollow tubes and the coil springs, engaging the nuts to press the coil springs. Thus the wheel cover has an elevated effect of visual appearance and a shock-absorbing function.

4 Claims, 6 Drawing Sheets

(A-A)

WHEEL RIM COVER

BACKGROUND OF THE INVENTION

1. Field of the Invention

This invention relates to a wheel rim cover, particularly to one with its dimensions increased without really changing the original size of a wheel rim cover, strengthening its innovative visional appearance, having good shock-absorbing effect and convenient for assembling.

2. Description of the Prior Art

Conventional wheel rim covers are generally provided for decoration of a vehicle, especially cars, and a conventional wheel rim cover shown in FIGS. 1 and 2 includes a cover body 10, a plurality of fixing members 101 provided to protrude sidewise on the inner circumference of the cover body 10 and spaced apart equidistantly, and a circular ring 102 for the fixing members 101 to fix with stably. Then the fixing members 101 are fixed around a wheel rim to combine the wheel cover body 10 on the outer side of the wheel rim so as to increase the decorative appearance of the wheel rim. The size of a wheel rim cover depends on the size of a wheel rim which a wheel cover is to be used on, and the scope of covering only extends to its circumferential area, but it lacks evident change of its appearance, impossible to satisfy curiosity of car fans or would-be buyers.

SUMMARY OF THE INVENTION

The object of the invention is to offer a wheel rim cover with its dimensions increased and with simple assemblage, with shock-absorbing effect and increased decorative appearance.

The feature of the invention is a wheel rim cover body and an outer decorative cover combined together. The cover body has a plurality of fixing members spaced apart around its circumference and protruding sidewise on an inner circumferential edge. A circular ring is provided for the fixing members to fix with. The cover body has a plurality of hollow tubes protruding sidewise on an inner surface of the cover body in an equidistantly spaced distance and a coil spring fits around each tube. The decorative cover has a diameter larger than that of the cover body, having threaded rods respectively to fit through the tubes of the cover body and a washer fitting around and engaging with a nut. Thus the decorative cover is combined on an outer side of the cover body by means of the threaded rods with the nuts and the tubes, finishing assembly of the wheel rim cover in the invention.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
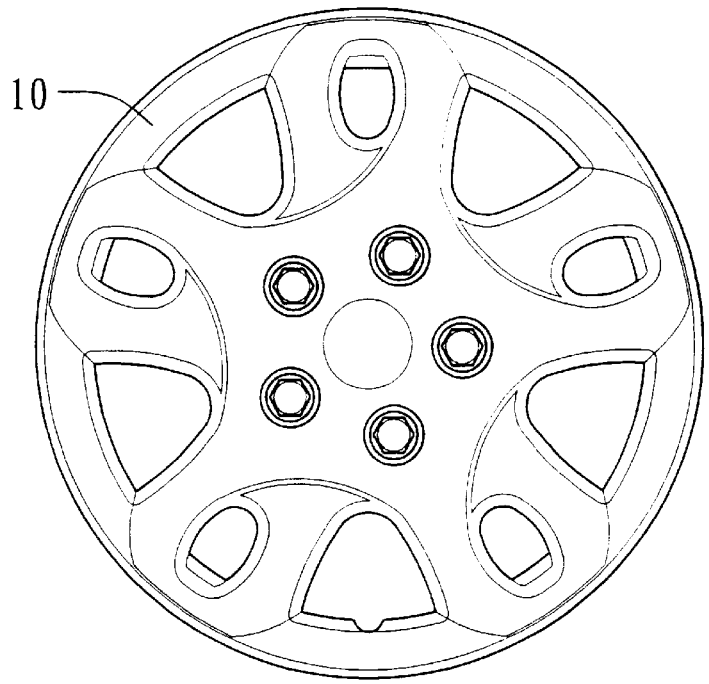
FIG. 1 is a front view of a conventional wheel rim cover.
Figure 2:
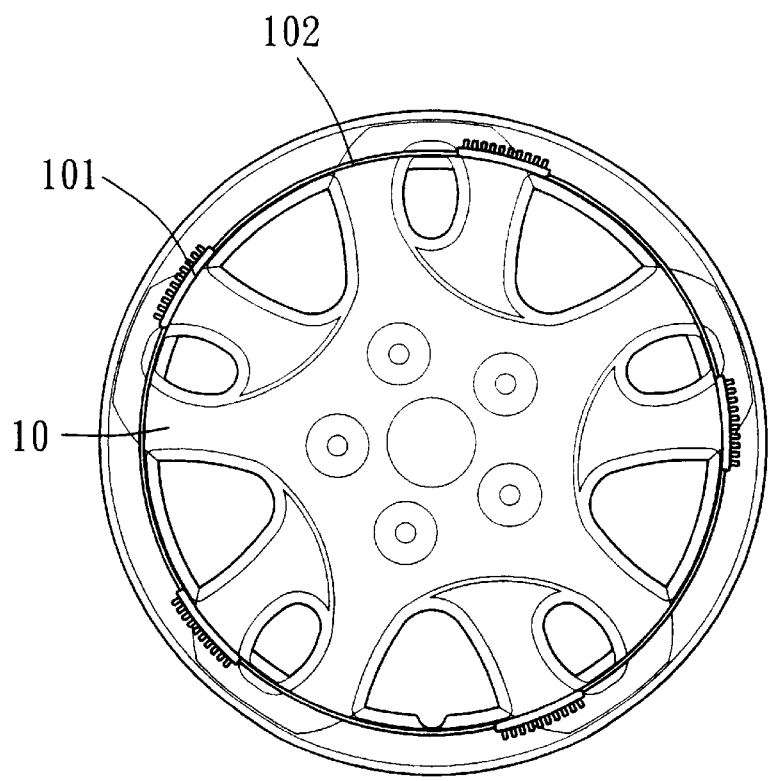
FIG. 2 is a rear view of the conventional wheel rim cover.
Figure 3:
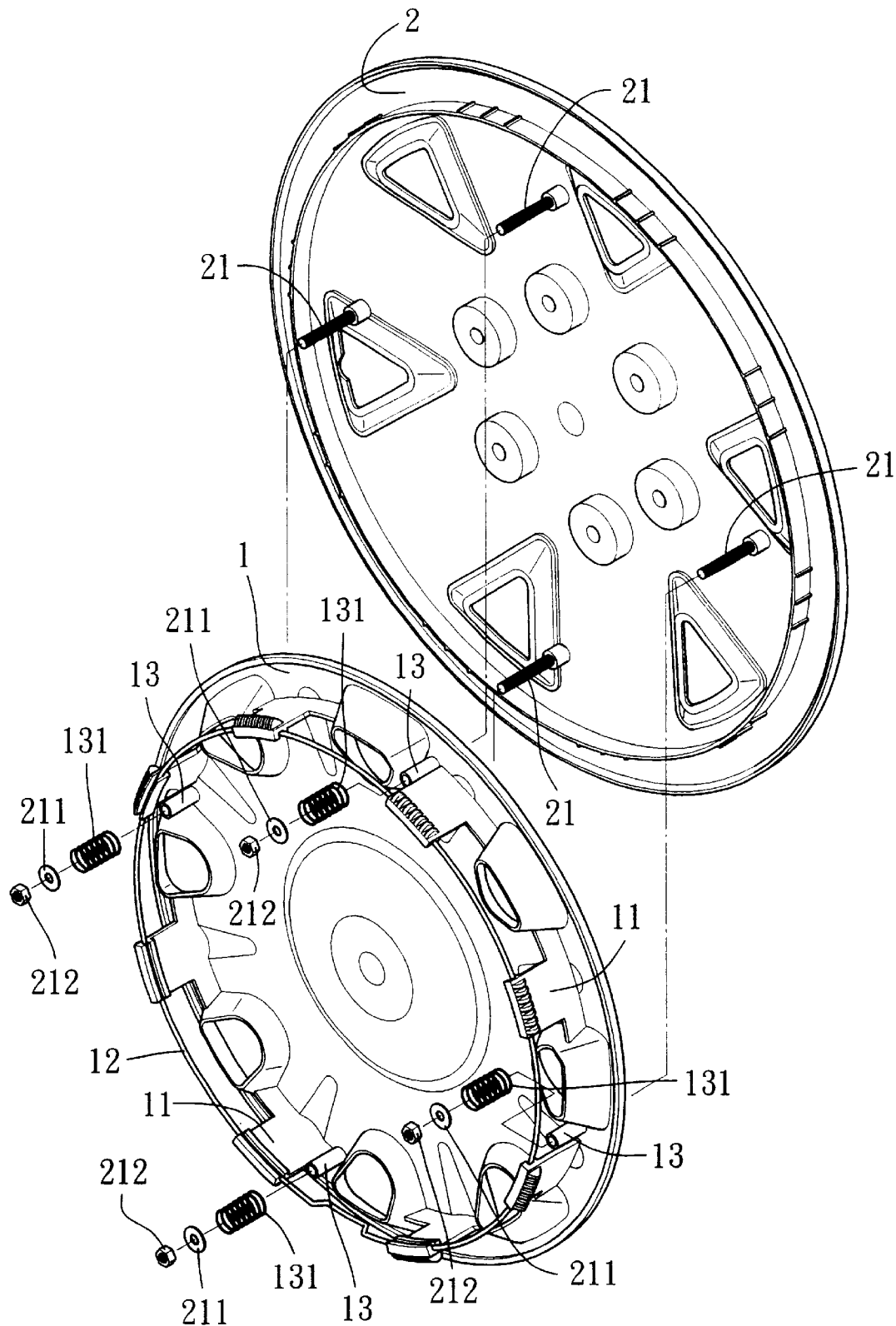
FIG. 3 is an exploded perspective view of a wheel rim cover in the present invention.

A preferred embodiment of a wheel rim cover in the present invention, as shown in FIG. 3, includes a cover body 1 and a decorative cover 2 positioned at an outer side of the cover body 1.

The cover body 1 has a proper diameter to cover a wheel rim, having a plurality of fixing members 11 arranged to protrude sidewise on an inner surface of the cover body 1 and spaced apart equidistantly around near its circumference, The fixing members 11 fix with a circular ring 12 tightly, and the cover body 1 further has a plurality of holes respectively between every two fixing members 11 in a circular shape, and a hollow tube 13 fixed upright sidewise on each hole, and a coil spring 131 fitting around each fixing member 13.

The decorative cover 2 has a diameter larger than that of the cover body 1, having a plurality of threaded rods 21 respectively fitting in the hollow tubes 13 of the cover body 1, and a washer fits around each threaded rod 21 and a nut 212 engages with each threaded rod 21 so as to combine the decorative cover 2 with the cover body 1.

Figure 4:
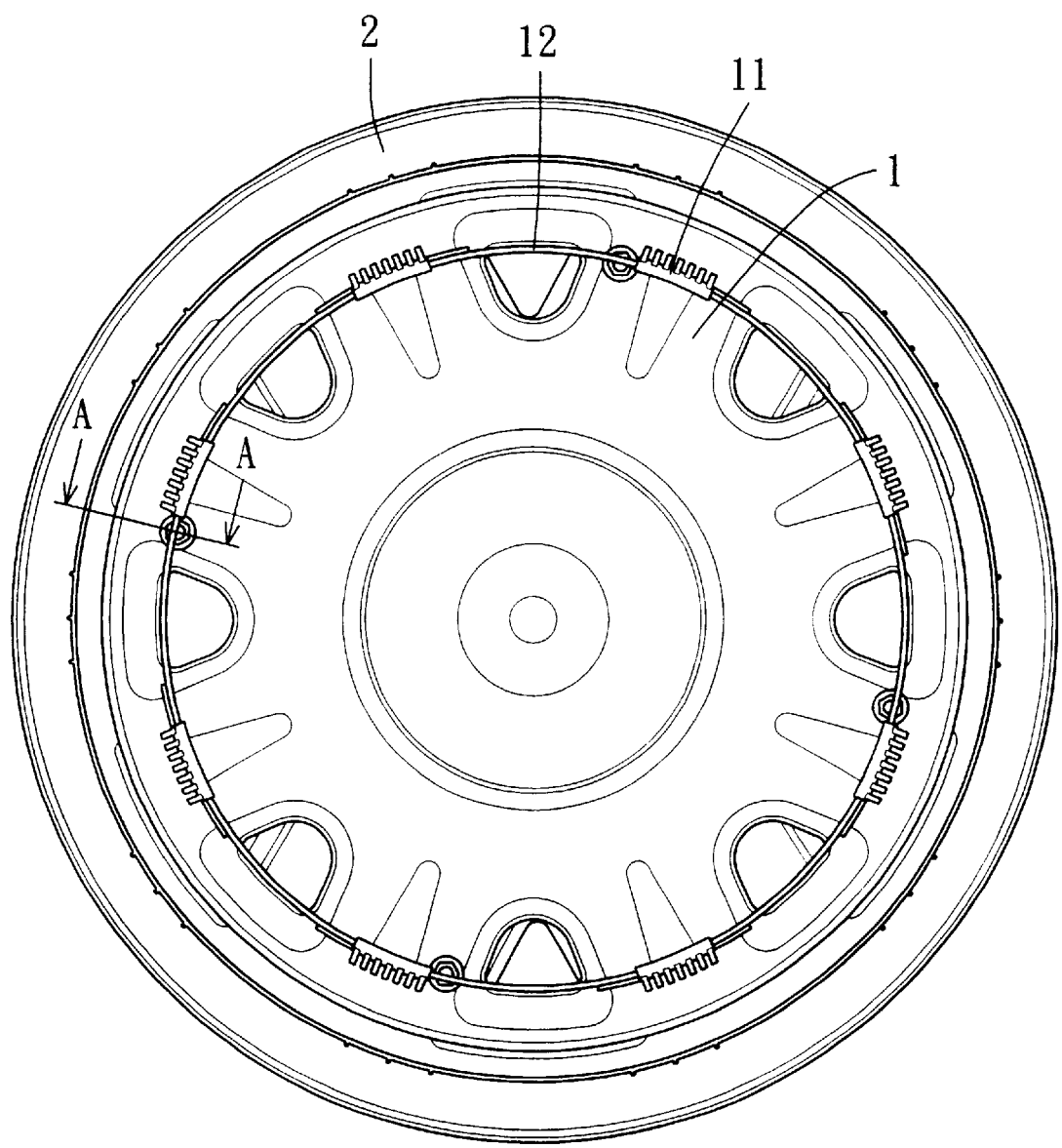
FIG. 4 is a rear view of the wheel rim cover in the present invention.
Figure 5:
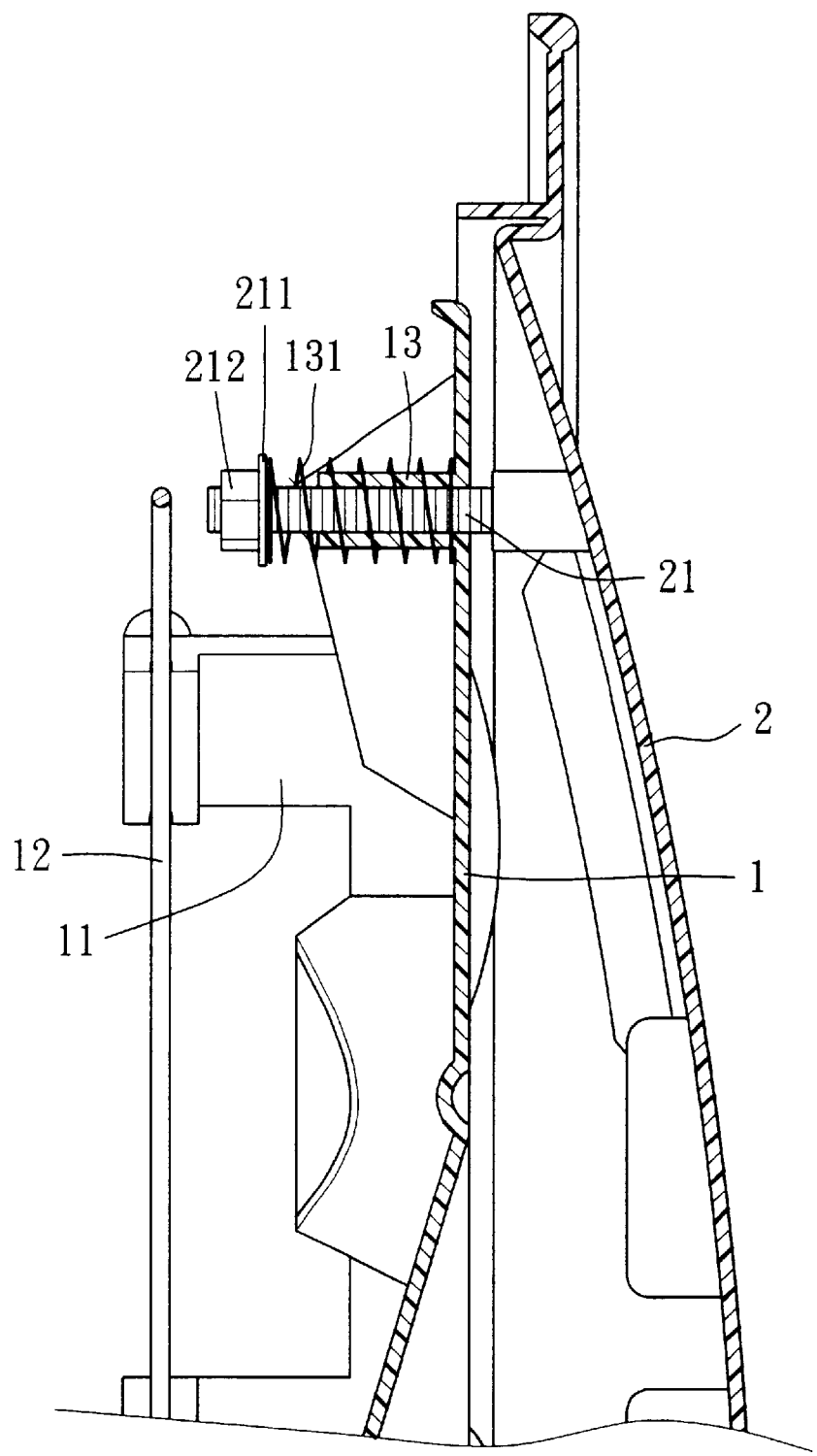
FIG. 5 is a cross-sectional view of the line A—A in FIG. 4.

Next, FIGS. 4 and 5 show the cover body 1 combined with the decorative cover 2, with the decorative body 2 positioned at the outer side of the cover body 1, with the threaded rods aligned and extending through the hollow tubbes 13 of the cover body 1, and with the nuts 212 engaging with the threaded rods 21 so that the two ends of the coil springs 131 have two ends urging the inner surface of the cover body 1 and the washers 211, as shown in FIG. 5. Then the decorative cover 2 may have shock-absorbing function owing to the coil springs 131. Thus, the wheel rim cover in the invention is quite easy to assemble, elevating effect of the wheel rim cover and enabling the decorative cover structured to have shock-absorbing function.

Figure 6:
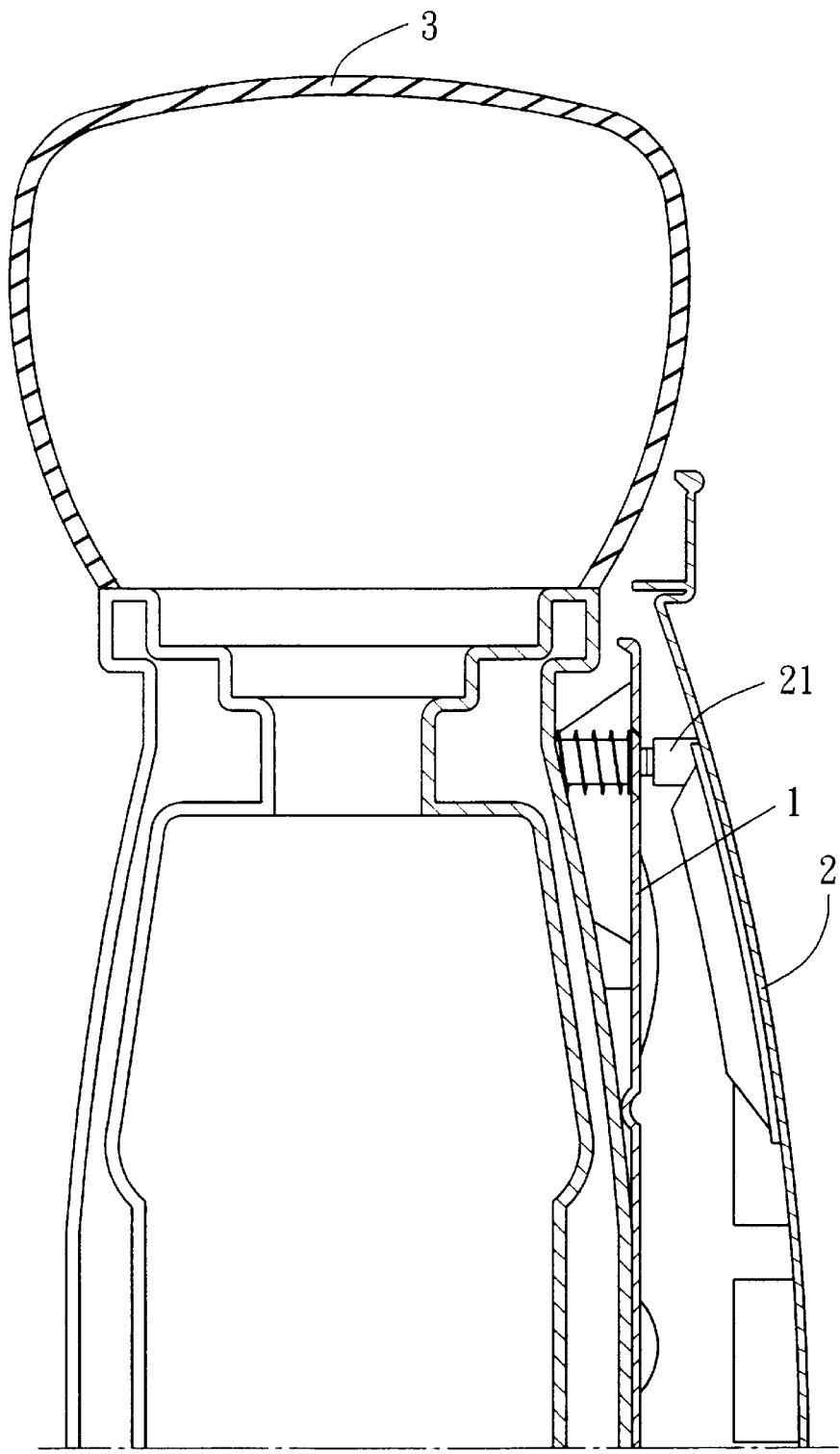
FIG. 6 is a cross-sectional view of the wheel rim cover combined with a wheel rim in the present invention; and, FIG. 7 is a cross-sectional view of the wheel rim cove being operated in the present invention.
Figure 7:
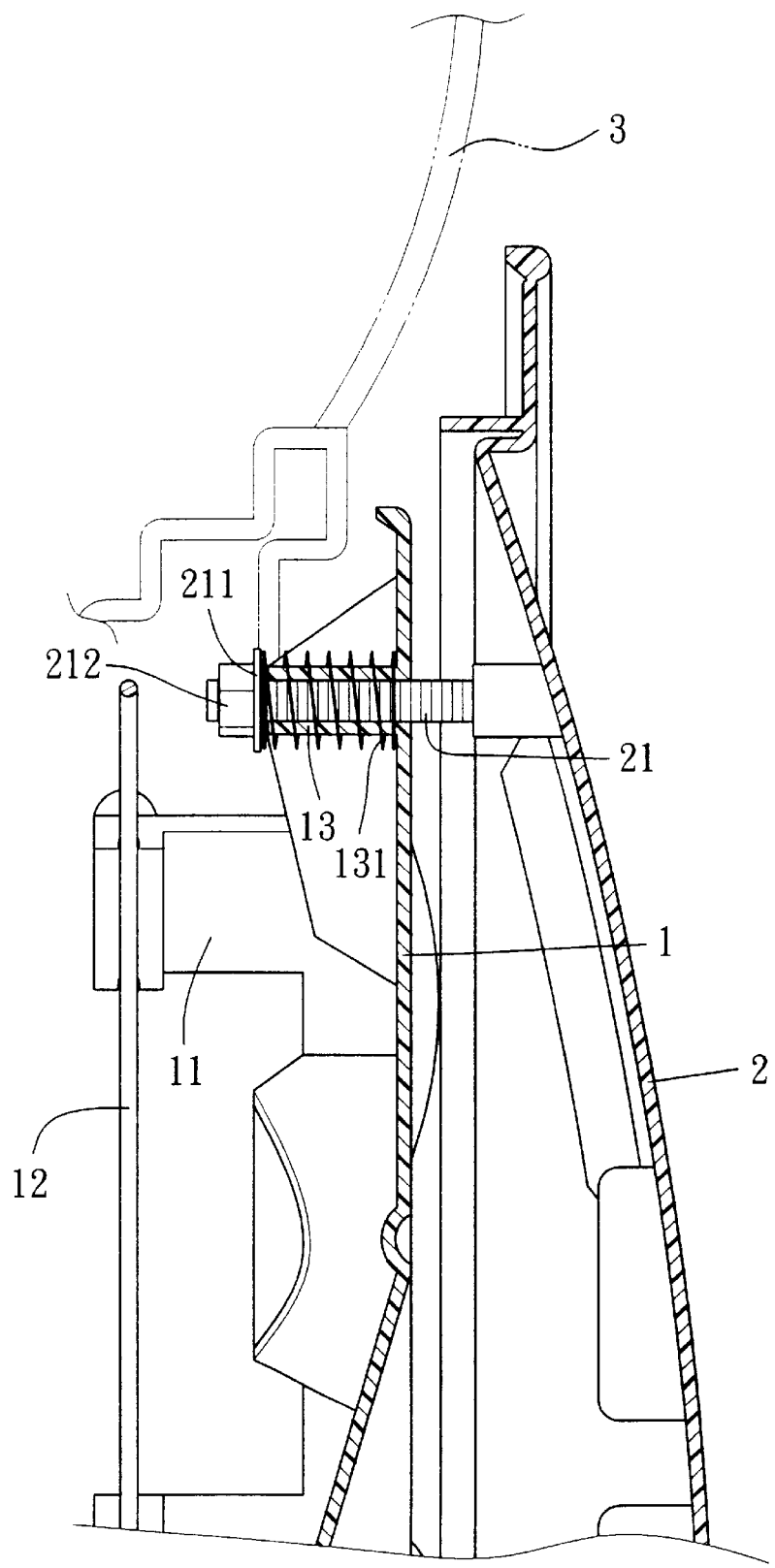

As shown in FIG. 6, the cover body 1 is fixed with a wheel rim 3 by means of the fixing members 11, properly covering on the wheel rim 3, with the decorative cover 2 hiding the cover body 1 and a part of a wheel tire 31, letting the wheel cover look like increased in its size. Further, the coil springs 131 is positioned between the cover body 1 and the washers 211, which press the coil springs 131, so that when the wheel tire 31 touches the inner surface of the decorative cover 2 in case of a vibration caused by the car running on a rough road or over a pit in the road, the decorative cover 2 may automatically shifts outward, as shown in FIG. 7. Then the washers 211 may continue to press a bit the coil springs 131 until the road becomes flat and the coil springs 131 automatically recover, with the cover body 1 and the decorative cover 2 both recover at the same time the original position as shown in FIG. 5. This is the reason why the wheel tire 31 and the decorative cover 2 may be reduced in their collision and wear, prolonging the usable life of the cover body 1 and the decorative cover 2 and ensuring car's running safety.

While the preferred embodiment of the invention has been described above, it will be recognized and understood that various modifications may be made therein and the appended claims are intended to cover all such modifications that may fall within the spirit and scope of the invention.

What is claimed is:

1. A wheel rim cover comprising a cover body and a decorative cover added on an outer surface of said cover body, said cover body having a plurality of fixing members protruding from and spaced apart equidistantly in a circle on an inner surface of said cover body, a circular ring fixed with said fixing members, said cover body having a plurality of holes, a plurality of coil springs respectively provided on the inner surface of said cover body adjacent said holes, said decorative cover having a diameter larger than that of said cover body and a plurality of connecting rods provided on an inner surface and respectively aligned with said holes of said cover body, said connecting rods respectively having a positioning component; said decorative cover combined and positioned at an outer side of said cover body with said connecting rods extending through said holes of said cover body and said coil springs and engaging with said positioning components to press said coil springs so that said wheel rim cover has an elevated effect and a shock-absorbing function.

2. The wheel cover as claimed in claim 1, wherein a hollow tube is further fixed on each said hole of said cover body, and said coil springs fit around said hollow tubes.

3. The wheel cover as claimed in claim 1, wherein said connecting rods are threaded rods with male threads.

4. The wheel cover as claimed in claim 1, wherein said positioning components of said connecting rods respectively consists of a washer and a nut.

\* \* \* \* \*